United States Patent [19]

Holl et al.

[11] Patent Number: 4,458,350

[45] Date of Patent: Jul. 3, 1984

[54] VARIABLE OUTPUT COUPLER FOR LASER CAVITIES WITH TOTALLY REFLECTING MIRRORS

[75] Inventors: Herbert B. Holl; Thomas G. Roberts; Thomas A. Barr, Jr., all of Huntsville, Ala.

[73] Assignee: The United States of America as represented by the Secretary of the Army, Washington, D.C.

[21] Appl. No.: 78,996

[22] Filed: Sep. 26, 1979

[51] Int. Cl.$^3$ ............................................. H01S 3/08
[52] U.S. Cl. ..................................... 372/108; 372/99; 350/289
[58] Field of Search ...................... 331/94.5 C, 94.5 D, 331/94.5 Q, 94.5 M; 356/289

[56] References Cited

U.S. PATENT DOCUMENTS 3,449,057  6/1969  Levitt .................................. 356/134

Primary Examiner—William L. Sikes
Assistant Examiner—Léon Scott, Jr.
Attorney, Agent, or Firm—Robert P. Gibson; Anthony T. Lane; Robert C. Sims

[57] ABSTRACT

An output coupler, for laser cavities with totally reflecting mirrors, having a beam splitter and a mirror mounted so that the direction of the output beam of the laser is invariant to changes in the output coupling coefficients. The percentage of the laser's energy which is coupled out into an external beam can be continuously varied or varied to obtain the optimum output coupling coefficient and then left set on this value. This device can also be used as a variable beam splitter with an invariant direction for the reflected beam when used external to the cavity of any laser.

4 Claims, 6 Drawing Figures

VARIABLE OUTPUT COUPLER FOR LASER CAVITIES WITH TOTALLY REFLECTING MIRRORS

DEDICATORY CLAUSE

This invention described herein may be manufactured, used, and licensed by or for the Government for governmental purposes without payment to us of any royalties thereon.

BACKGROUND OF THE INVENTION

The optimum output coupling coefficient (the percentage of the radiation energy in a laser cavity that is extracted as a laser beam) is a function of many of the properties of the laser. For some lasers with small gains the optimum output coupling coefficient may be as small as 1 or 2 percent, and if one tries to couple out more than say 7%, the laser will not reach threshold, and no radiation will be produced. On the other hand, lasers with very high gains like chemical lasers require output coupling coefficients like 25% or higher.

Currently energy is coupled out of laser cavities in several ways. The two most frequently used methods today, are called transmission coupling and hole coupling. For transmission coupling one of the mirrors is made by placing a partially reflecting coating on a substrate that transmits the wavelength being generated by the laser. To use transmission coupling it is necessary to produce a set of mirrors that consist of one for each percentage of the radiation that one wishes to couple out, and it is generally necessary to produce a different set of mirrors for each wavelength considered. For hole coupling one of the mirrors either has a hole cut in the center of the mirror which is generally made by placing a totally reflecting coating on a substrate that has good properties for mirror making but does not transmit the laser's wavelength, or one of the mirrors is smaller that the diameter of the optically active medium, so that radiation is coupled out around the edges of this mirror. This is the method generally used with unstable resonators. Here, again, to measure the optimum output coupling coefficient it is necessary to produce a set of mirrors with various size holes.

When full size "totally" reflecting mirrors are used to form the laser cavity (a so-called closed cavity), radiation can be coupled out by placing a beam splitter in the cavity in front of one of the mirrors. This method has the advantage of being able to change the output coupling coefficient by simply rotating the beam splitter so that the angle of incidence is changed, but this has the disadvantage of rotating the output beam through twice the angle that the beam splitter was rotated.

DESCRIPTION OF THE PREFERRED EMBODIMENT

Figure 1:
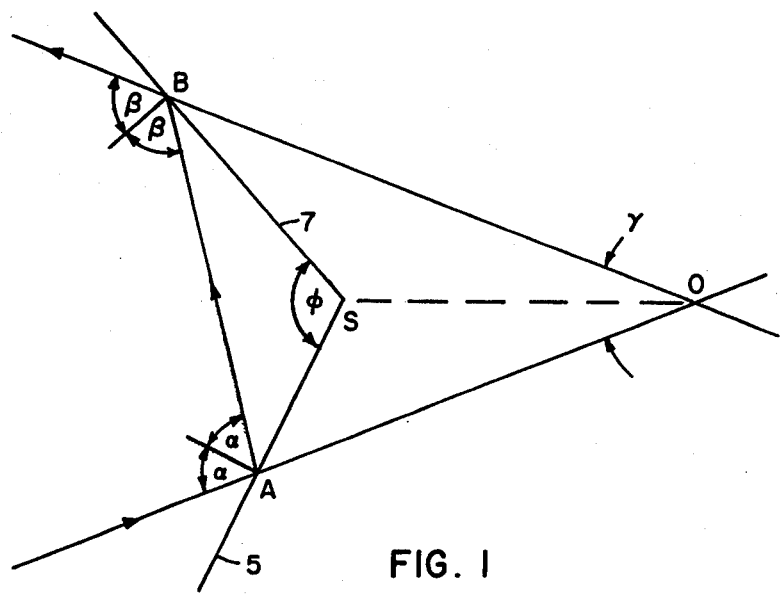
FIG. 1 is an optical diagram of the variable beams splitter.
Figure 2:
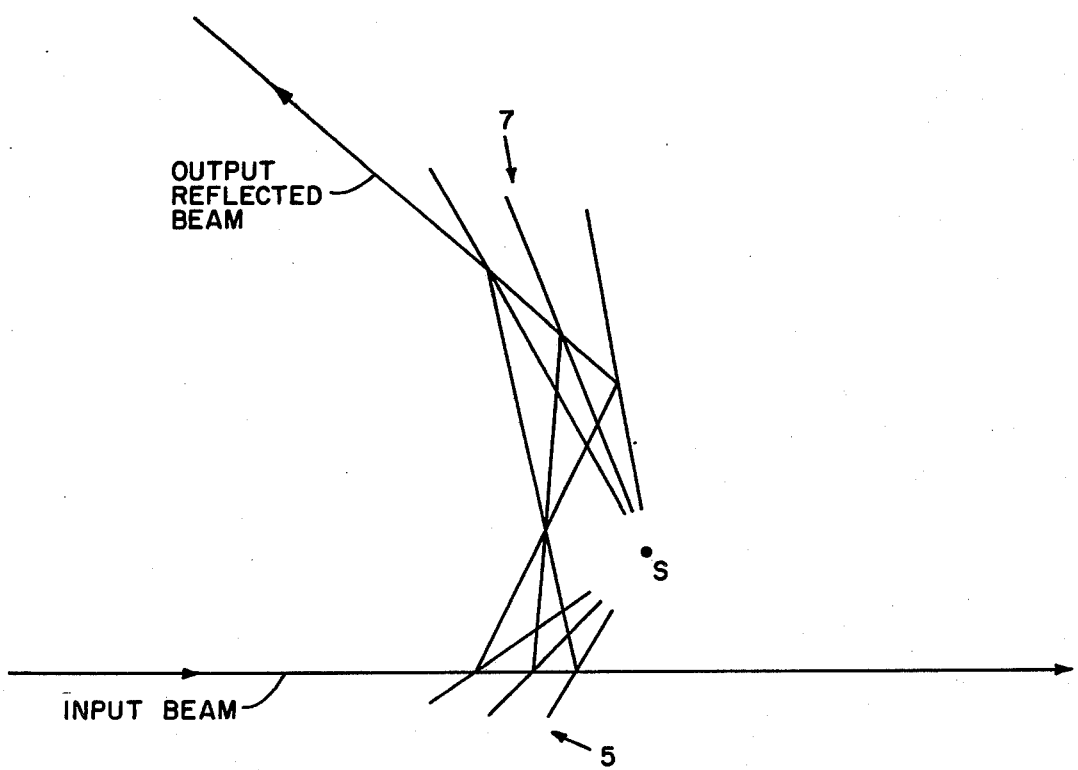
FIG. 2 is a diagram showing the invarience of the output beam.
Figure 4:
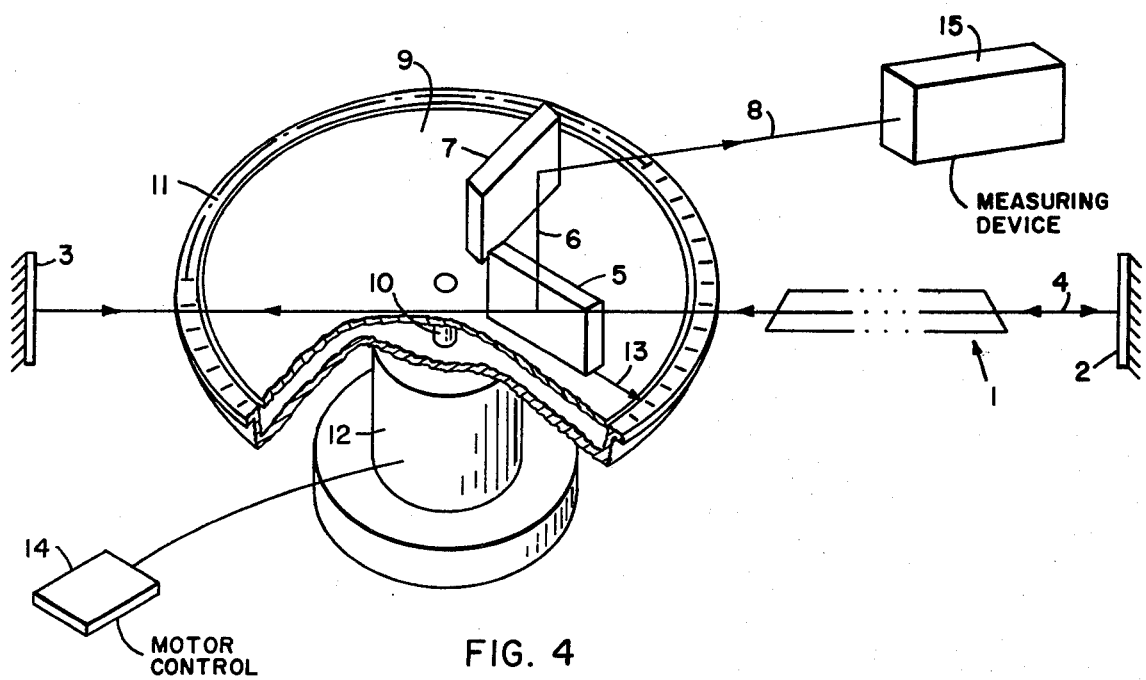
FIG. 4 is a diagrammatic showing of the preferred embodiment of the present invention.

The invention disclosed here provides a beam splitter and a totally reflecting mirror mounted on a single platform so that the output coupling coefficient can be varied continuously or be preset as a desired value without effecting the direction of the output beam. This is accomplished as illustrated in FIGS. 1, 2 and 4 where one of the mirrors of the closed cavity is located anywhere on the line A and perpendicular to it but not on the platform, the beam splitter is 5, and the totally reflecting mirror is 7. When the platform 9 holding 5 and 7 is rotated about an axis through S, the angles of incidence $\alpha$ and $\beta$, and therefore the percentage of the energy reflected (coupled out) is varied, but $\alpha+\beta=$ constant, the angles $\alpha$ and $\beta$ change is such a way that the direction of the beam leaving 7 does not change as illustrated in FIG. 2. FIG. 2 is a showing of this invariance for three different settings of the incidence angle. It should be noted at this point that this device could be used externally to any laser cavity as a means of splitting off a variable percentage of the laser's beam while the direction of the reflected part of the beam is being held constant for any desirable application.

Figure 3:
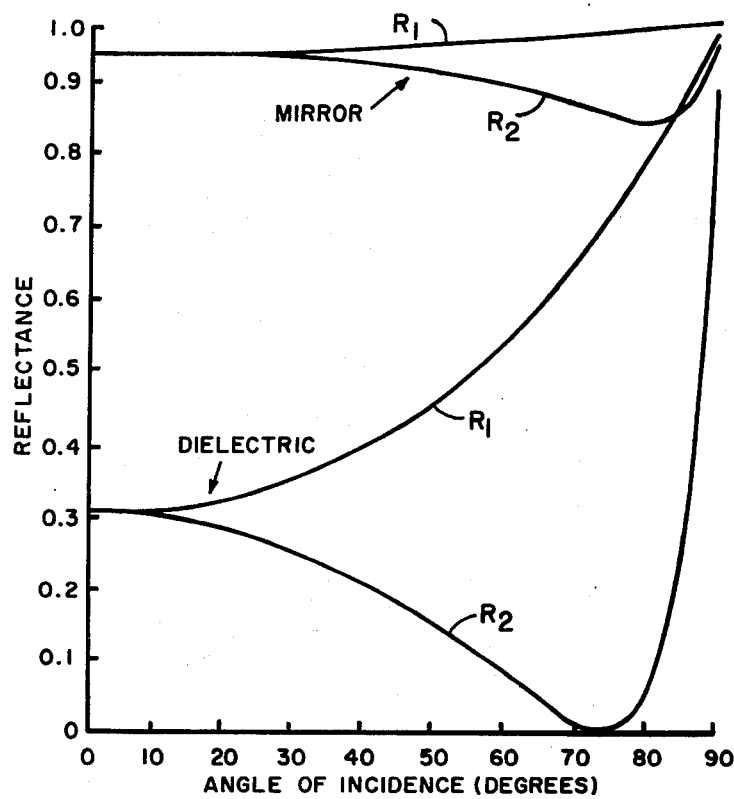
FIG. 3 is a curve showing reflection coefficience as a function of angle of incidence.

The manner in which the percentage of the light that is reflected varies with incidence angle is illustrated in FIG. 3. Here the curves marked $R_1$ are for the component of the light polarized so that the electric vector is perpendicular to the plane of incidence and the curve marked $R_2$ are for the component of the light polarized so that the electric vector is parallel to the plane of incidence. Two sets of curves are shown one for a dielectric material typical of that used as a beam splitter in the infrared and one for a gold mirror at He-Ne wavelengths. In either case the reflection coefficient for unpolarized radiation is given by $R=\frac{1}{2}(R_1+R_2)$. Lasers frequently utilize windows at Brewsters angle so that the radiation is plane polarized. In this case large changes in the reflectance (the output coupling) can be obtained for relatively small changes in the angle of incidence.

Figure 5:
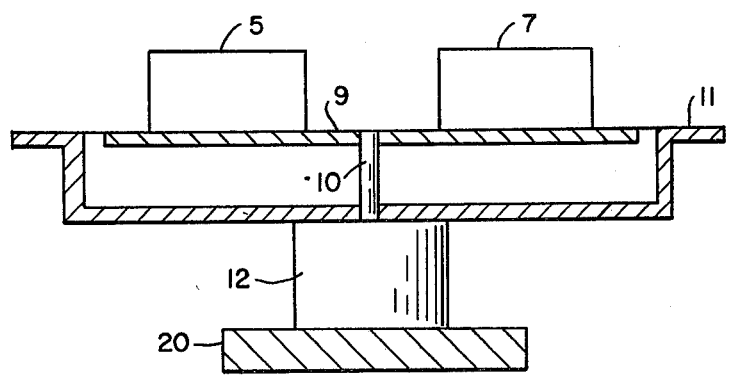
FIG. 5 is a side view of FIG. 4.
Figure 6:
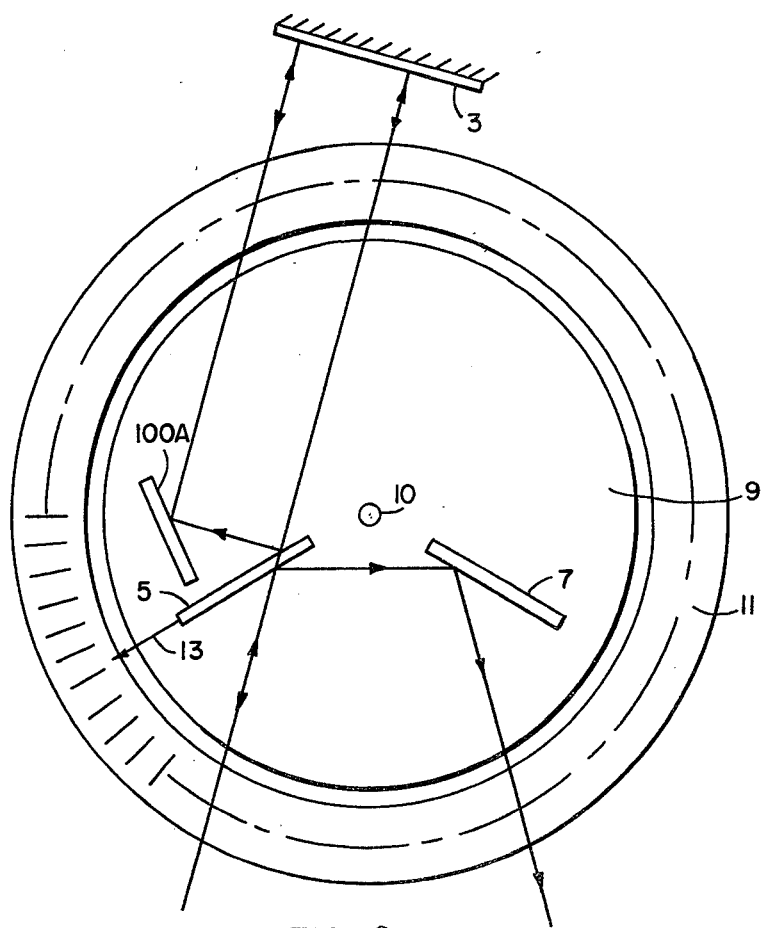
FIG. 6 is a top view of FIG. 4.

Referring to the drawing in FIG. 4 a laser 1 with a closed optical cavity formed by the two totally reflecting mirrors 2 and 3 is used to illustrate the variable output coupler. Such a cavity would be used for wavelengths where it is difficult to obtain transmitting material from which good mirrors can be made or for very low gain lasers where the losses have to be minimized. The radiation in the cavity 4 intersects the beam splitter 5 where part of this radiation is reflected to the mirror 7. The rest of this radiation is transmitted through the beam splitter and is reflected from the mirror 3 to supply the feedback for the laser cavity. The reflected beam 6 is intercepted by the mirror 7 which then again reflects this beam to form the output beam 8 which is invariant in direction. The percentage of the radiation that is reflected to form the output beam (coupled out) is a function of the angle of incidence—the angle formed by the beam 4 and the normal vector to the surface of the beam splitter 5 at the point of intersection. The mirror 7 and the beam splitter 5 are mounted on a plate or platform 9 which is connected to the motor shaft 10. A second plate or ring 11 is mounted to the motor housing 12 and does not rotate when the plate 9 is rotated by the motor shaft 10. The plate or ring 11 is calibrated so that the arrow 13 on plate 9 indicates the angle of incidence. This is not a simple linear scale, but it is one that is not difficult to calibrate. The motor may be operated so that it turns slowly and can be easily stopped at a desired angle of incidence or it can be operated in a stepping mode. In the stepping mode the plate 9 is rotated by a small angle each time the motor is energized. The controls for the motor are indicated by the box 14. Both the motor and the controls are purchased items which are well known in the art. FIGS. 5 and 6 are side and top views of the output coupler used as a beam splitter with an invariant output beam. These figures are included here as an aid in visualizing FIG. 4. FIG. 5 shows that the motor 12 which is small is mounted on a base 20 that is made to fit various optical benches like those generally used to mount lasers and laser components. A measuring device 15 is positioned to receive beam 8. In the illustration the mirrors 5 and 7 form an angle greater than 90°; therefore device 15 can be positioned off center to the main beam.

There is a loss off the back side of the beam splitter which may be reduced by use of an antireflecting coating, but when another mirror 100A (FIG. 6) is placed at 90° to the beam splitter on the same platform with the beam splitter then this energy is reflected back into the laser cavity even while the platform is in rotation. The offset of this reflected beam is exaggerated due to the scale of the mirrors in the drawing. The mirror 100A may be placed slightly less than 90° to offset this.

We claim:

1. An output coupler of a laser having a main laser beam comprising a beam splitter located within the main beam of said laser; a front and a back side being part of said splitter; a portion of the laser beam being split by the front side of said beam splitter; rotation means having said beam splitter mounted thereon; a reflecting means mounted on said rotation means spaciously from said beam splitter so as to reflect the portion of the main beam of the laser that is split by said beam splitter; said portion of the laser beam being split is an output of said splitter; measurement means located remote from said rotation means; said measurement means being positioned to receive reflections from said reflecting means; said rotation means being selectively rotated so that said beam splitter will have an output that varies with the rotation of said rotation means; said measurement means measuring the output; said rotation means rotates about a center point; said beam splitter and said reflecting means being aligned towards said center point such that an angle if formed between the beam splitter and the reflecting means if they were extended to the center point.

2. A coupler as set forth in claim 1 wherein said measurement means is located in a fixed position regardless of the rotation of said rotation means and wherein the reflected beam from said reflecting means will have an invariant direction which will impinge upon said measurement means regardless of the rotation of said rotation means as long as the beam splitter is within the main laser beam.

3. A coupler as set forth in claim 2 wherein the angle formed by said beam splitter and said reflecting means is greater than 90°.

4. A coupler as set forth in claim 1 further comprising a second reflecting means positioned on said rotating means at an angle approximately 90° with respect to the back side of the beam splitter so as to reflect back into the main beam any loss of the beam from the back side of the beam splitter.

* * * * *